Feb. 8, 1949.     N. H. IVERSEN     2,461,059
CHUCK
Filed April 11, 1945
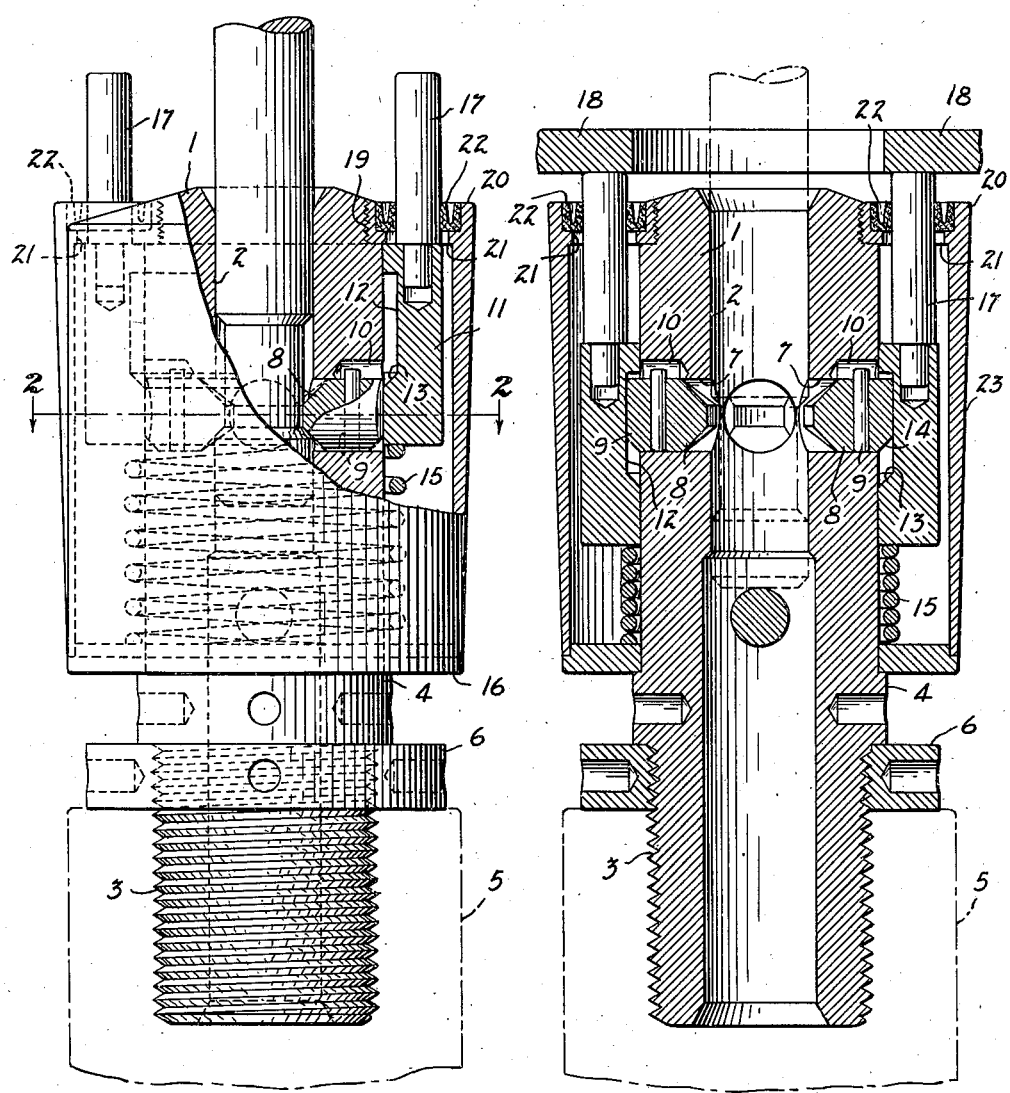
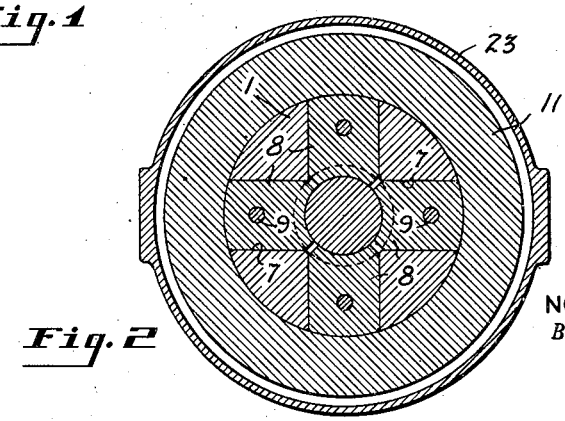
Fig. 1
Fig. 2
Fig. 3
INVENTOR.
NORMAN HILBERT IVERSEN
BY
Evans + McCoy
ATTORNEYS Patented Feb. 8, 1949

2,461,059

UNITED STATES PATENT OFFICE 2,461,059

CHUCK

Norman H. Iversen, Birmingham, Mich., assignor to Production Broaching Corporation, a corporation of Delaware Application April 11, 1945, Serial No. 587,666

2 Claims. (Cl. 279—82)

This invention relates to tool chucks or holders and particularly to chucks suitable for securing a tool such as a broach to an actuating head, the device of the present invention being an improvement on the chuck disclosed in my copending application Serial No. 517,688, filed January 10, 1944, now Patent No. 2,386,469.

This invention has for its object to provide a tool holding chuck in which the moving parts are so housed that entry of liquid coolant carrying metal particles to the bearing surfaces of the moving parts is prevented.

An additional object is to provide a chuck of the type in which the tool locking elements are actuated by a spring pressed sleeve in which the sleeve and its actuating spring are enclosed by a shield that is attached to the tool receiving end of the chuck.

With the above and other objects in view the invention may be said to comprise the chuck as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation of a chuck with a portion broken away and shown in axial section;

Fig. 2 is a section taken on the line indicated at 2—2 in Fig. 1, and

Fig. 3 is a longitudinal section showing the chuck in tool releasing position.

The chuck of the present invention has a body portion 1 that is cylindrical throughout the major portion of its length and that has an axial tool receiving bore 2 opening to the end of the cylindrical portion. The opposite end 3 of the body member is threaded and an enlarged wrench receiving portion 4 is provided between the threaded portion 3 and the cylindrical portion of the body member. The threaded portion 3 provides means of attachment to an actuating head 5, a locknut 6 being provided on the threaded portion 3 between the enlarged portion 4 of the body member and the head 5.

The body member 1 is provided with radial openings 7 to the axial bore 2 and in the openings 7 dogs 8 are slidably mounted. The dogs 8 have tapered tool engaging ends that engage in a suitable recess in the tool and each dog 8 carries a pin 9 that engages in a slot 10 in the wall of the opening 7 to limit the movement of the dogs. The dogs 8 are actuated by means of a sleeve 11 which has a sliding fit on the cylindrical body member 1, the sleeve 11 having an annular internal recess 12 which in one position of the sleeve permits the dogs 8 to move outwardly to tool releasing position. At the inner end thereof the recess 12 has a beveled shoulder 13 that is adapted to engage with shoulders 14 on the dogs 8 to move the dogs inwardly to locking position, the inner end of the sleeve 11 serving to retain the dogs 8 in locking position.

A spring 15 engages the inner end of the sleeve 11 and serves to hold the same in its locking position, the spring 15 being a coiled spring surrounding the body member 1, with one end engaging the inner end of the sleeve 11 and its opposite end seated upon an annular disc 16 that fits on the cylindrical portion of the body member 1 and seats against the enlarged portion 4 of the body member. The sleeve 11 has axially extending pins 17 attached thereto that project beyond the end of the body member 1 for engagement with a stop plate 18 which is so disposed as to be engaged by the pins at one limit of movement of the actuating head 5. The engagement of the stop plates 18 with the pins 17 causes the sleeve 11 to be moved inwardly in opposition to the spring 15 to the position shown in Fig. 3 where the dogs 8 are free to move into the recess 12 to tool releasing position so that a tool may be inserted into or removed from the bore 2.

At the tool receiving end thereof the body member 1 has a reduced threaded end portion 19 upon which an annular shield 20 may be screwed. The shield 20 is of an external diameter greater than the sleeve 11 and has axial openings 21 through which the pins 17 extend. Suitable sealing rings 22 are mounted in the shield 20 around the openings 21 for engagement with the axially movable pins 17 and these sealing rings provide seals which prevent the entry of liquid coolant and metal particles through the openings 21. The shield 20 has a cylindrical skirt portion 23 that encloses the sleeve 11 and spring 15, the inner end of the skirt 23 engaging with the spring seating disc 16 and forming with the disc 16 a housing for the sleeve and spring.

The sleeve 11 is normally held in the position shown in Fig. 1 by the spring 15, the shield 20 serving as a stop to limit the outward movement of the sleeve. In this position of the sleeve the dogs 8 are held in tool locking position as shown in Fig. 1. During operation of the tool, metal chips and liquid coolant containing fine particles of metal may drop upon the upper end of the tool, but this foreign matter which might otherwise clog the bearing surfaces of the moving parts of the chuck is excluded from the moving parts of the chuck by the shield 20 and sealing rings 22.

It is to be understood that variations and modifications of the specific device herein shown and described for purposes of illustration, may be made without departing from the spirit of the invention.

What I claim is:

1. A chuck comprising a body member having a tool receiving socket in one end, tool locking means carried by said body member, means comprising a sleeve slidably mounted on the body member for actuating said locking means, an annular shield of greater diameter than the sleeve attached to the tool receiving end of said body member and overlying the adjacent end of the sleeve, said shield having axial openings alined with the sleeve and a tubular skirt portion enclosing the sleeve, axially extending pins extending from said sleeve through said openings, a disc fixed to said body and closing the inner end of the annular space between said skirt and said body, and a spring interposed between said disc and said sleeve to normally hold said sleeve against said overlying portion of said shield.

2. A chuck comprising a body member having a tool receiving socket in one end and an external shoulder spaced from said end, the portion of the body member between said shoulder and tool receiving end being cylindrical, means for locking a tool in said socket, an annular disc mounted on said body member and seated against said shoulder, a lock actuating sleeve slidable on said body member, a spring interposed between said disk and sleeve, pins projecting axially from the sleeve past the tool receiving end of the body member, and an annular shield having threaded engagement with the tool receiving end of said body member, said shield having openings through which said pins project, and a tubular skirt portion covering the sleeve and spring and engaging said disc, said shield and disc forming a housing fixed to said body and enclosing said sleeve and spring.

NORMAN H. IVERSEN.

REFERENCES CITED

The following references are of record in the file of this patent:

UNITED STATES PATENTS

| Number | Name | Date |
|---|---|---|
| 1,209,572 | Fegley | Dec. 19, 1916 |
| 2,081,040 | King | May 18, 1937 |
| 2,386,469 | Iversen | Oct. 9, 1945 |